United States Patent
Slaven, Jr. et al.

(10) Patent No.: US 9,937,685 B2
(45) Date of Patent: Apr. 10, 2018

(54) INDUSTRIAL PRODUCTS ENGINEERED FROM PROCESSED BAMBOO OR VEGETABLE CANE

(71) Applicant: Resource Fiber LLC, Bianbridge Island, WA (US)

(72) Inventors: Leland Slaven, Jr., Tampa, FL (US); David Knight, Bainbridge Island, WA (US)

(73) Assignee: Resource Fiber LLC, Homewood, AL (US)

( * ) Notice: Subject to any disclaimer, the term of this patent is extended or adjusted under 35 U.S.C. 154(b) by 0 days.

(21) Appl. No.: 15/147,765

(22) Filed: May 5, 2016

(65) Prior Publication Data

US 2016/0325530 A1 Nov. 10, 2016

Related U.S. Application Data

(60) Provisional application No. 62/157,363, filed on May 5, 2015.

(51) Int. Cl.
| | |
|---|---|
| *B32B 21/08* | (2006.01) |
| *E01B 3/10* | (2006.01) |
| *E04C 3/12* | (2006.01) |
| *E01B 3/44* | (2006.01) |

(52) U.S. Cl.
CPC ............... *B32B 21/08* (2013.01); *E01B 3/10* (2013.01); *E01B 3/44* (2013.01); *E04C 3/122* (2013.01); *B32B 2307/54* (2013.01)

(58) Field of Classification Search
CPC ............. Y10T 428/167; Y10T 428/183; Y10T 428/18; B32B 21/08; B32B 21/13; E04C 3/122; B27J 1/003
See application file for complete search history.

(56) References Cited

U.S. PATENT DOCUMENTS

| | | | | |
|---|---|---|---|---|
| 8,173,236 | B1 * | 5/2012 | McDonald | B27D 1/06 428/47 |
| 8,561,373 | B1 * | 10/2013 | McDonald | E04C 3/14 52/841 |

* cited by examiner

*Primary Examiner* — Alexander Thomas
(74) *Attorney, Agent, or Firm* — Perkins Coie LLP

(57) ABSTRACT

A natural fiber-based, engineered beam assembly comprising opposing top and bottom surfaces, opposing first and second side surfaces and a longitudinal axis. Loads applied to the beam assembly are normal to the top surface. Substantially parallel layers of flattened bamboo or vegetable cane culms are stacked and laminated together. Each layer is formed by at least one culm, and each culm has fiber bundles extending substantially parallel to the longitudinal axis and are impregnated with a binder. The density of the fiber bundles in the culm decreases across the culm's thickness from the exterior surface to the interior surface. At least a plurality of the culms have a common orientation, wherein the exterior surfaces face toward a same one of the top, bottom, first or second side surfaces.

20 Claims, 4 Drawing Sheets

INDUSTRIAL PRODUCTS ENGINEERED FROM PROCESSED BAMBOO OR VEGETABLE CANE

CROSS REFERENCE TO RELATED APPLICATION

This non-provisional patent application claims the benefit of and priority to U.S. Provisional Patent Application No. 62/157,363, titled Railroad Cross Ties, Utility Pole Cross Arms and other Industrial products engineered from processed Bamboo or Vegetable Cane, filed May 5, 2015, which is incorporated herein in its entirety by reference thereto.

TECHNICAL FIELD

This disclosure relates to producing railroad cross ties, utility pole cross arms and other industrial products using processed bamboo and/or vegetable cane fiber.

BACKGROUND

Bamboo and other vegetable cane are very fibrous and popular for use as building and textile materials. The strength and orientation of the fiber make it ideal for engineering industrial products requiring specific properties for varying uses.

SUMMARY

The present disclosure describes embodiments of processes and orientations of bamboo or vegetable cane fiber for improved mechanical properties with engineered supportive and structural members for other industrial uses. The producing of railroad cross ties, utility pole cross arms, and other industrial use products with improved mechanical properties of laminated bamboo or vegetable cane.

An embodiment of the present technology provides a natural fiber-based, engineered beam assembly upon which loads are applied. The beam assembly comprises opposing top and bottom surfaces, opposing first and second side surfaces extending between the top and bottom surfaces, and a longitudinal axis substantially parallel to the top, bottom, first, and second side surfaces. The loads are substantially normal to the top or bottom surface. A plurality of substantially parallel layers of flattened bamboo or vegetable cane culms are stacked and laminated together. Each layer is formed by at least one flattened, generally planar culm, and each culm has a plurality of fiber bundles extending substantially parallel to the longitudinal axis and impregnated with a binder. Each culm has a thickness between opposing exterior and interior surfaces, wherein a density of the fiber bundles substantially decreases across the thickness from the exterior surface to the interior surface. At least a plurality of the culms have a common orientation, wherein the exterior surfaces face toward a same one of the top, bottom, first or second side surfaces. The culms forming outermost layers define the top and bottom surfaces.

The plurality of substantially parallel layers can comprise a first outer layer defining the top surface, a second outer layer defining the bottom surface, and a plurality of interior layers between first and second outer layers, wherein the interior layers have a common orientation with the exterior surface of a first interior layer being immediately adjacent to the interior surface of an adjacent second intermediate layer. The interior layers can have alternating orientations. The beam assembly can be configured as a railroad cross tie.

Another embodiment provides a natural fiber-based, engineered beam assembly upon which a load is applied. The beam assembly comprises opposing top and bottom surfaces, opposing first and second side surfaces extending between the top and bottom surfaces, and a longitudinal axis substantially parallel to the top, bottom, first, and second side surfaces. The load is a compressive load applied substantially normal to the top or bottom surface. A plurality of substantially parallel layers of flattened bamboo or vegetable cane culms are stacked and laminated together. Each layer is formed by at least one flattened, generally planar culm, and each culm has a plurality of fiber bundles extending substantially parallel to the longitudinal axis and impregnated with a binder. Each culm has a thickness between opposing exterior and interior surfaces, wherein a density of the fiber bundles substantially decreases across the thickness from the exterior surface to the interior surface. At least a plurality of the culms have a common orientation, wherein the exterior surfaces face toward a same one of the top, bottom, first or second side surfaces. The culms forming the outermost layers define the first and second surfaces.

Another embodiment provides an engineered beam assembly upon which loads are applied, and the beam assembly comprises opposing top and bottom surfaces, opposing first and second side surfaces extending between the top and bottom surfaces, and a longitudinal axis substantially parallel to the top and bottom surfaces. The loads are substantially normal to the top or bottom surface. A plurality of substantially parallel layers of flattened bamboo or vegetable cane culms are stacked and laminated together, and each layer is formed by at least one flattened, generally planar culm. Each culm has a plurality of fiber bundles extending substantially parallel to the longitudinal axis and impregnated with a binder. Each culm has a thickness between opposing exterior and interior surfaces, wherein a density of the fiber bundles substantially decreases across the thickness from the exterior surface to the interior surface. At least a plurality of the culms have alternating orientations, wherein the exterior surfaces of adjacent layers face in opposite directions relative to the top surface or first surface. The culms forming outermost layers can face in opposite directions with the exterior surfaces defining the top and bottom surfaces.

BRIEF DESCRIPTION OF DRAWINGS

Embodiments of the technology introduced herein may be better understood by referring to the following Detailed Description in conjunction with the accompanying drawings, in which like reference numerals indicate identical or functionally similar elements.

Figure 1:
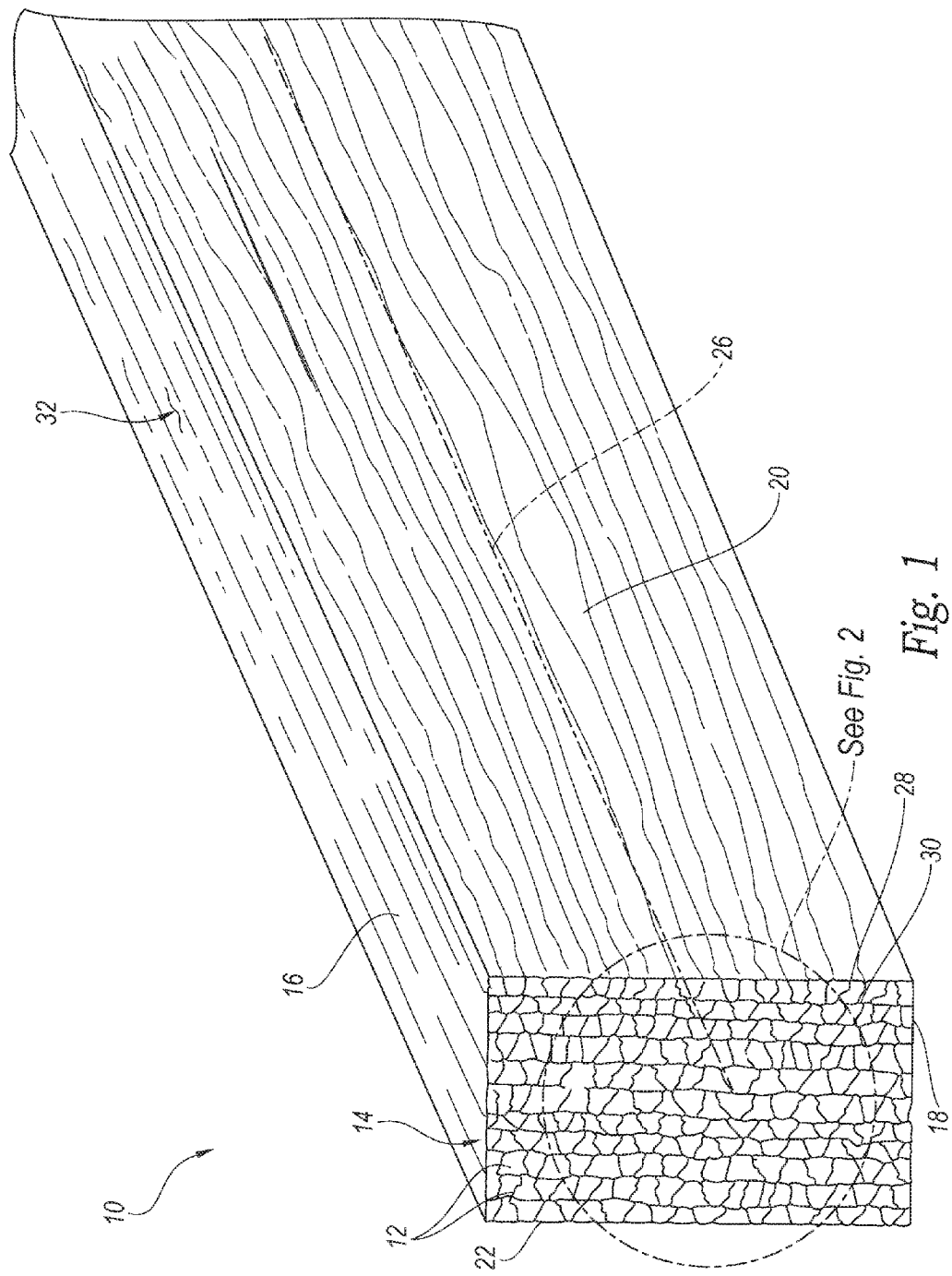
FIG. 1 is a schematic view of flattened and processed bamboo or vegetable cane culms or stalks laminated together to form a beam in accordance with an embodiment of the present technology and in an orientation suitable for use as a utility pole cross arm or other beam type members requiring a higher MOR (Modulus of Rupture) in the direction of intended force and lower MOE (Modulus of Elasticity), which may be suitable for other industrial uses.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Various examples of the products, process and methodology introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1 an isometric view of a beam assembly 10 made of stacked layers 12 of flattened bamboo or vegetable fiber culms 14 selectively oriented and laminated together in accordance with an embodiment of the present technology. The illustrated beam assembly 10 has a generally rectangular cross-sectional shape defined by opposing top and bottom surfaces 16 and 18, respectively, extending between opposing first and second side surfaces 20 and 22, respectively. The illustrated beam assembly 10 has a height "H", a width "W", and a length "L". Although the illustrated beam is shown with a particular shape, the beam assembly 10 of other embodiments can have other shapes or relative dimensions.

Each of the assembly's laminated layers 12 is formed by one or more flattened culms 14 having elongated fibers or fiber bundles 24 extending generally parallel to the longitudinal axis 26 of the beam assembly 10 and the assembly's length L. In at least one embodiment, the flattened culms 14 are flattened bamboo culms having a culm exterior surface 28 and an opposing culm interior surface 30. The culm exterior surface 28 corresponds to the outer surface of a bamboo stock when in the cylindrical, un-flattened configuration, and the culm interior surface 30 corresponds to the interior surface of the hollow, un-flattened bamboo stock. By flattening the culm or stalk, it aligns the fiber bundles in a more direct plane that allows the development of the improved engineered products. In the illustrated embodiment, the bamboo culm 14 is flattened in the manner disclosed in Applicant's U.S. patent application Ser. No. 14/673,659, titled APPARATUS AND METHOD FOR PROCESSING BAMBOO OR VEGETABLE CANE, filed Mar. 30, 2015, which is incorporated herein in its entirety by reference thereto, as opposed to the conventional method of cutting it longitudinally into thin strips, and this flattening process allows the fibers to separate along their natural fiber boundaries. This exposing the weakest fibers to be bonded together later during engineered manufacturing by selectively orienting and stacking the flattened bamboo culms 14 and laminating them together under high pressures with a selected binding material, such as a glue or other adhesive. In at least one embodiment, the bonding material can be a phenolic resin-based adhesive, a soy resin-based adhesive, or other suitable adhesives for exterior and/or industrial use.

Figure 2:
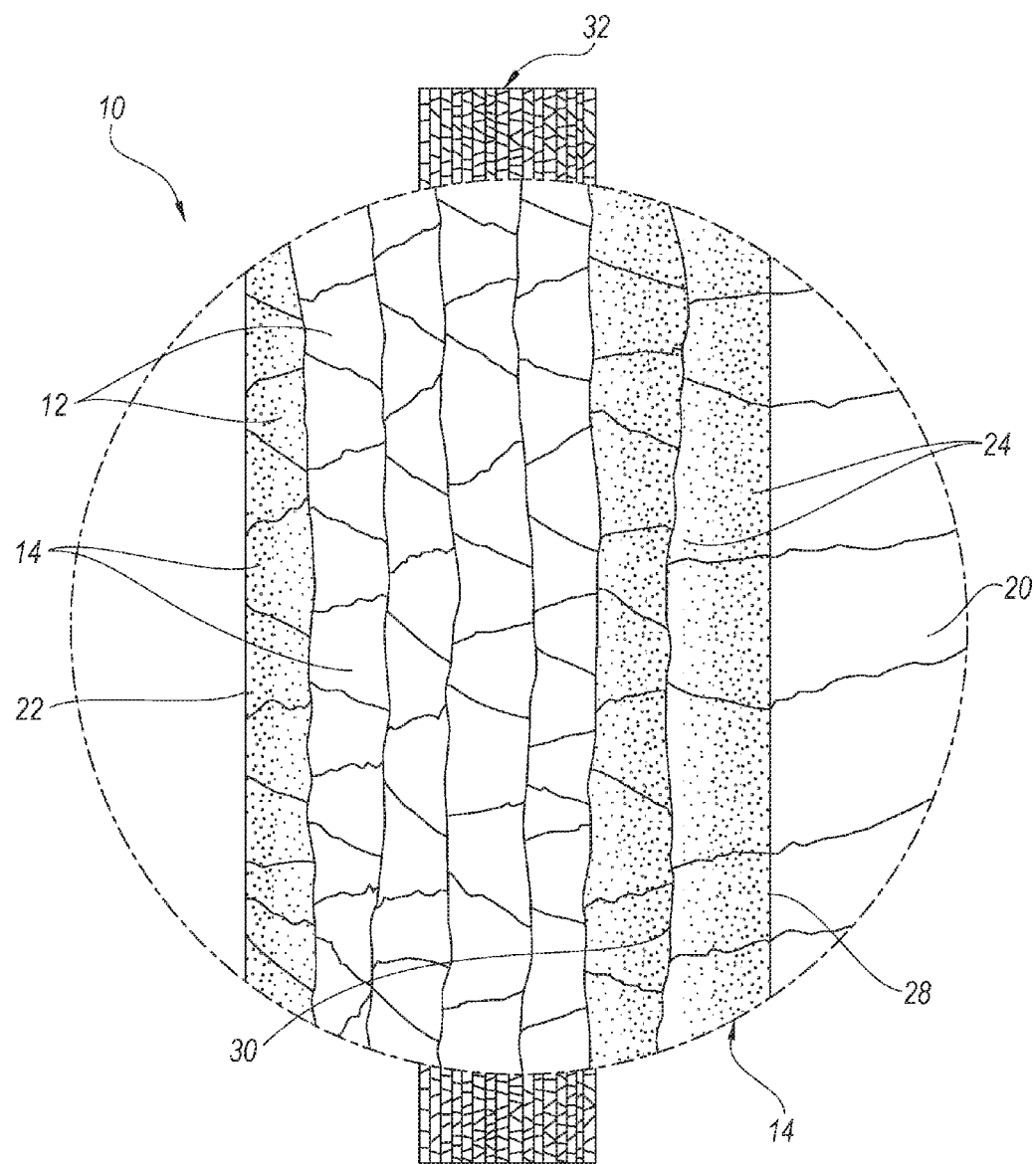
FIG. 2 is an enlarged end view of the laminated member taken at callout A-A of FIG. 1 showing in detail the layers of flattened culms and positioning of fiber bundles of the bamboo or vegetable cane.

As seen in FIG. 2, each flattened culm 14 has a natural formation of fiber bundles that are more dense and closely grouped toward the culm exterior surface 28. The fiber frequency and density diminish moving inward across the thickness of the layer 12 away from the culm exterior surface 28 toward the culm interior surface 30. In the illustrated embodiments, the flattened culms 14 are stacked and layered together in substantially the same orientation, such that all of the fibers 24 are substantially parallel and the culm exterior surface 28 (i.e., the surface with the higher density of fibers) of one flattened culm 14 is immediately adjacent to the culm interior surface 30 (i.e., the surface with the lower density of fibers) of the next culm. In at least one embodiment, a top or bottom most flattened culm 14 defining the top or bottom surface 16 or 18 may be positioned in an inverted arrangement as compared to the other flattened culms 14 in the beam, so as to provide harder outermost opposing top and bottom surfaces 16 and 18 of the beam 10. In another embodiment, the beam assembly 10 can have a stacked orientation of the flattened culms 14 that are alternatingly inverted, such that the culm exterior surface 28 of one flattened culm 14 is immediately adjacent to the exterior surface of the next flattened culm, and/or the interior surface of a flattened culm is immediately adjacent to the interior surface of the next flattened culm in the beam. Another embodiment of the beam assembly has the bamboo culms 14 forming the top half of the beam in substantially the same orientation with the culm exterior surfaces 28 facing toward the beam's top surface 16, and the bamboo culms 14 forming the bottom half have the inverted orientation with the culm exterior surfaces 28 facing toward the beam's bottom surface 18. Accordingly, two middle layers 12 have the culm interior surfaces 30 immediately adjacent to each other.

The beam assembly 10 of FIG. 1 is an engineered beam assembly with the culm exterior surfaces 28 and culm interior surfaces 30 facing toward the opposing side surfaces 20 and/or 22. This illustrated beam assembly 10 is configured for use as a stiff, load bearing structural member, such as utility pole cross arm or other industrial load bearing member, wherein the primary anticipated loads 32 applied to the beam assembly 10 during use are a direction normal to the top or bottom surfaces 16 and 18 (i.e., substantially parallel to the side surfaces 20 and 22). This engineered beam assembly 10 provides a beam member with a higher MOR and lower MOE in the direction of the applied loads 32. In one embodiment, the beam assembly 10 is configured with a rectangular cross-sectional shape with the beam's height H being greater than the width, and the applied loads are in a direction substantially parallel with the beam's height dimension. An embodiment wherein the beam assembly's layers 12 are made of oriented, flattened, and conditioned bamboo culms 14 (with approximately 5 layers), the beam dimensions are approximately 8 in. (H)×1.5 in. (W)× 10 ft. (L), and the anticipate loads 32 are applied in the direction illustrated in FIG. 1, beam assembly's MOR is in the range of approximately 54 kpsi-56 kpsi and the MOE is in the range of approximately 6250 kpsi-6450 kpsi. In one embodiment, the MOR is approximately 54.94 kpsi, and the MOE is 6330.557 kpsi.

Figure 3:
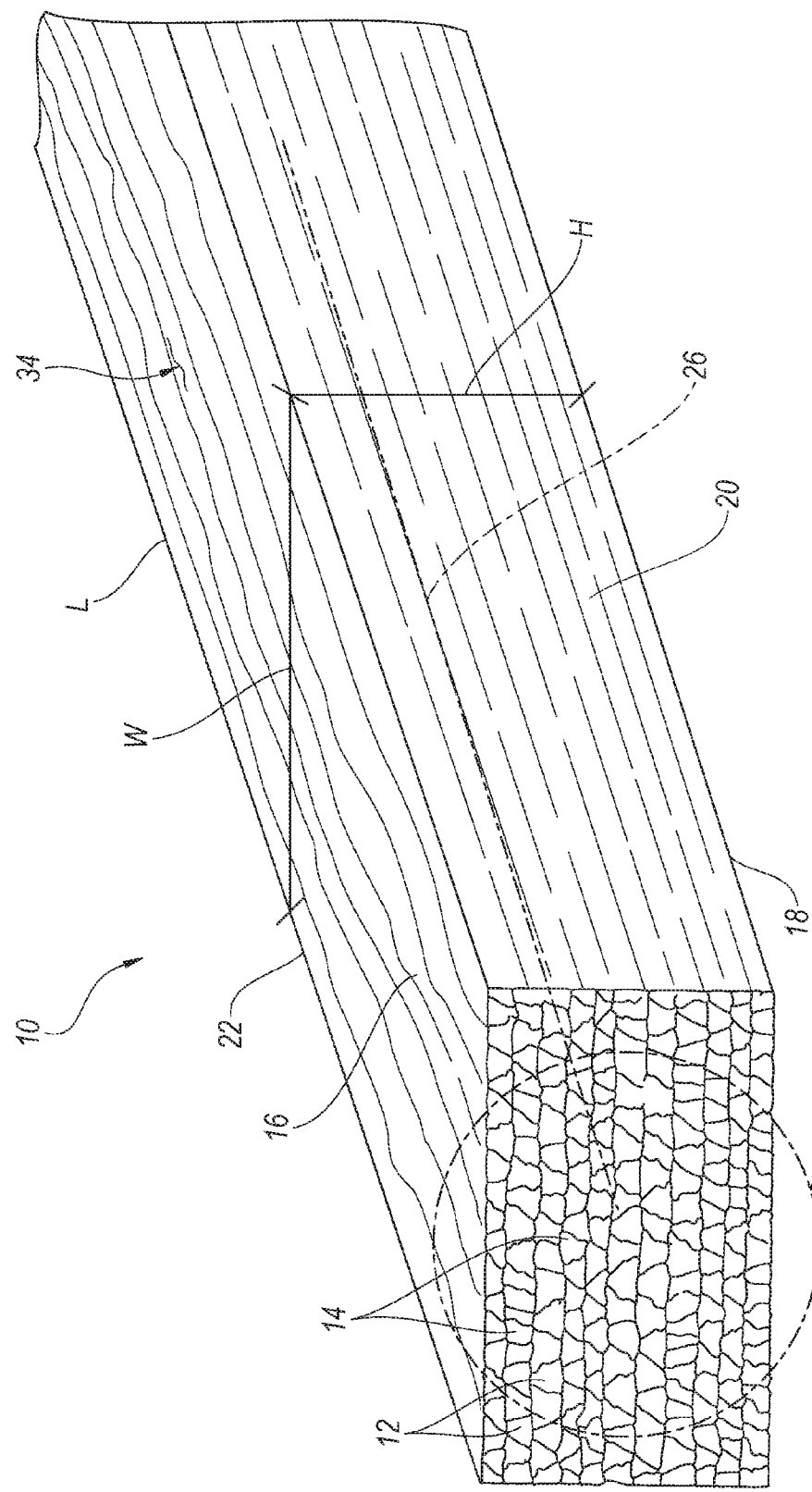
FIG. 3 is a schematic view of a beam in accordance with an embodiment of the present technology with a 90 degree orientation relative to FIG. 1 for a railroad cross tie or other beam type members requiring a higher MOE (Modulus of Elasticity) in the direction of intended force and a lower MOR (Modulus of Rupture), which may be suitable for other industrial uses.
Figure 4:
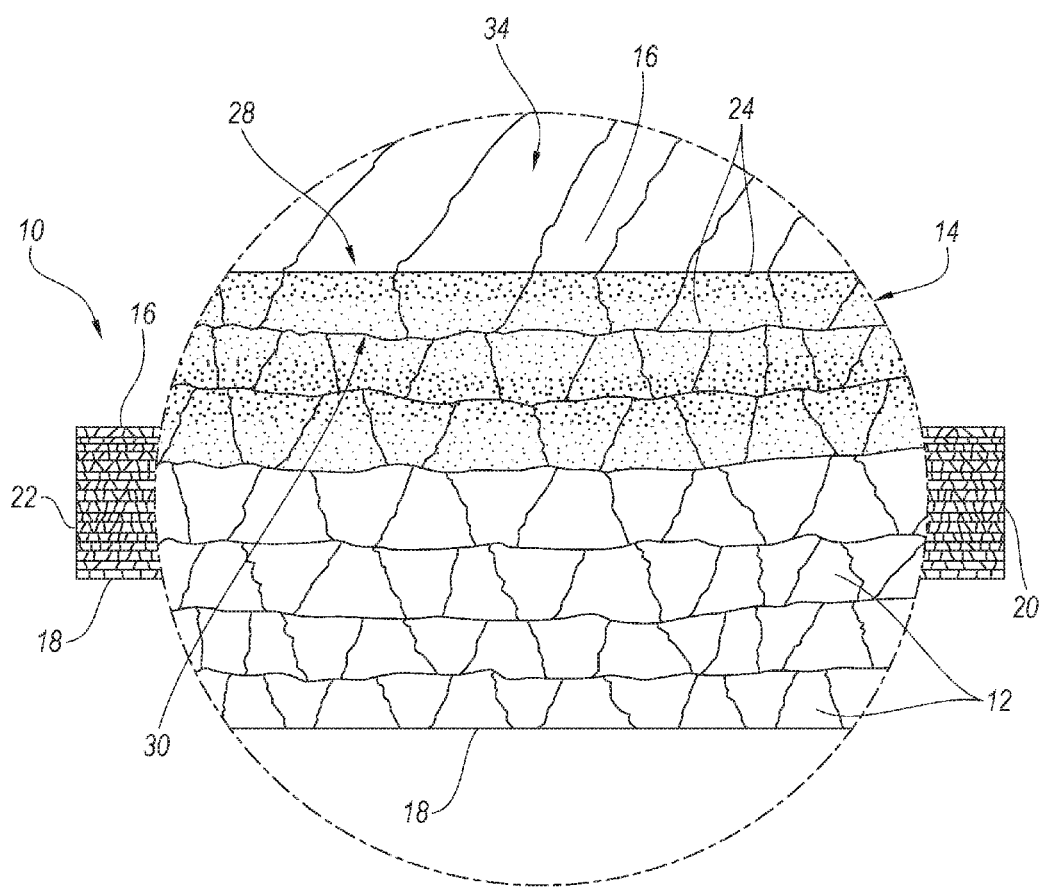
FIG. 4 is an enlarged end view of the laminated member taken at callout B-B of FIG. 3 showing in detail the layers of flattened culms and positioning of fiber bundles of the bamboo or vegetable cane.

In another embodiment shown in FIGS. 3 and 4, the beam assembly 10 is an engineered beam assembly with the culm exterior surfaces 28 and culm interior surfaces 30 facing toward the opposing top and/or and bottom surfaces 16 and 18. This illustrated beam assembly 10 is configured for use as a more flexible structural member, such as railroad tie or other industrial beam member, wherein the primary anticipated loads 34 applied to the beam assembly 10 during use are a direction normal to the top or bottom surfaces 16 and 18 (i.e., substantially parallel to the side surfaces 20 and 22). This engineered beam assembly 10 provides a beam member with a higher MOR and lower MOE in the direction of the applied loads 32. In one embodiment, the beam assembly 10 is configured with a rectangular cross-sectional shape with the beam's height H being greater than the width, and the applied loads are in a direction substantially parallel with the beam's height dimension. An embodiment wherein the beam assembly has approximately 5 layers and the dimensions are approximately 1.5 in. (H)×8 in. (W)×10 ft. (L), and the anticipate loads 34 are applied in the direction illustrated in FIG. 3, beam assembly's MOR is in the range of 59 kpsi-60 kpsi, and the MOE is in the range of approximately 2200 kpsi-2400 kpsi. In one embodiment, the MOR is approximately 60.236 kpsi, and the MOE is 2285.4 kpsi.

In another embodiment, the beam assembly has approximately 5 layers of oriented, flattened, and conditioned bamboo culms, and the dimensions are approximately 8 in. (H)×8 in. (W)×10 ft. (L). In the orientation with the anticipate loads 32 being applied in the direction as illustrated in FIG. 1, beam assembly's MOR is in the range of 54 kpsi-66 kpsi, and the MOE is in the range of approximately 11,500 kpsi-13,500 kpsi, and in one embodiment the MOR is approximately 54.94 kpsi and the MOE is approximately 12,661.113 kpsi. In an embodiment wherein the 8 in×8 in.×10 ft. beam assembly (with the 5 layers of oriented, flattened, and conditioned bamboo culms), and in an orientation with the anticipate loads 34 being applied in the direction as illustrated in FIG. 3, beam assembly's MOR is in the range of 119.5 kpsi-121.5 kpsi, and the MOE is in the range of approximately 6250 kpsi-6450 kpsi, and in one embodiment the MOR is approximately 120.473 kpsi and the MOE is approximately 6330.557 kpsi.

Producing railroad cross ties, utility pole cross arms, floor or ceiling joist, structural support members, truck-decking and/or other decking members, and other industrial use products with improved mechanical properties of laminated Bamboo or Vegetable Cane, rely on the ability to flatten the culms or stalks along their natural fiber boundaries. Orienting the flattened culm or stalk in proper direction for specific application and end use.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

We claim:

1. A natural fiber-based, engineered beam assembly upon which loads are applied, the beam assembly comprising:
    opposing top and bottom surfaces, opposing first and second side surfaces extending between the top and bottom surfaces, and a longitudinal axis substantially parallel to the top, bottom, first, and second side surfaces, wherein the loads are substantially normal to the top or bottom surface;
    a plurality of substantially parallel layers of flattened bamboo or vegetable cane culms stacked and laminated together, each layer formed by at least one flattened, generally planar culm, and each culm has a plurality of fiber bundles extending substantially parallel to the longitudinal axis and being impregnated with a binder, each culm having a thickness between opposing exterior and interior surfaces, wherein a density of the fiber bundles substantially decreases across the thickness from the exterior surface to the interior surface;
    wherein at least a plurality of the culms have a common orientation, wherein the exterior surfaces face toward a same one of the top or bottom surfaces;
    wherein the exterior surfaces of the culms that form outermost layers define the top and bottom surfaces, and opposing edge portions of the culms that form each interior layer define the first and second side surfaces.

2. The assembly of claim 1 wherein the plurality of substantially parallel layers comprise a first outer layer defining the top surface, a second outer layer defining the bottom surface, and a plurality of interior layers between first and second outer layers, the interior layers having a common orientation with the exterior surface of a first interior layer being immediately adjacent to the interior surface of an adjacent second interior layer.

3. The assembly of claim 1 wherein the plurality of substantially parallel layers comprise a first outer layer defining the top surface, a second outer layer defining the bottom surface, and a plurality of interior layers between first and second outer layers, the interior layers having an alternating orientation with the exterior surface of a first interior layer being immediately adjacent to the exterior surface of an adjacent second interior layer.

4. The assembly of claim 3 wherein the interior surface of the first interior layer being immediately adjacent to the interior surface of a third interior layer adjacent to the first interior layer.

5. The assembly of claim 1 wherein the layers are defined by flattened bamboo culms.

6. The assembly of claim 1, wherein the beam assembly is configured as a railroad cross tie.

7. The assembly of claim 1, further comprising a height defined by the first or second side surface, and a width defined by the top or bottom surface, wherein the height is less than the width.

8. A natural fiber-based, engineered beam assembly upon which a load is applied, the beam assembly comprising:
   opposing top and bottom surfaces, opposing first and second side surfaces extending between the top and bottom surfaces, and a longitudinal axis substantially parallel to the top, bottom, first, and second side surfaces, wherein the load is a compressive load applied substantially normal to the top or bottom surface;
   a plurality of substantially parallel layers of flattened bamboo or vegetable cane culms stacked and laminated together, each layer formed by at least one flattened, generally planar culm, and each culm has a plurality of fiber bundles extending substantially parallel to the longitudinal axis and being impregnated with a binder, each culm having a thickness between opposing exterior and interior surfaces, wherein a density of the fiber bundles substantially decreases across the thickness from the exterior surface to the interior surface;
   wherein at least a plurality of the culms have a common orientation, wherein the exterior surfaces face toward a same one of the first or second side surfaces; and
   wherein the exterior surfaces of the culms that form outermost layers define the first and second side surfaces, and opposing edge portions of the culms that form each interior layer define the top and bottom surfaces.

9. The assembly of claim 8 wherein the plurality of substantially parallel layers comprise a first outer layer defining the first side surface, a second outer layer defining the second side surface, and a plurality of interior layers between first and second outer layers, the interior layers having a common orientation with the exterior surface of a first interior layer being immediately adjacent to the interior surface of an adjacent second interior layer.

10. The assembly of claim 8 wherein the plurality of substantially parallel layers comprise a first outer layer defining the first side surface, a second outer layer defining the second side surface, and a plurality of interior layers between first and second outer layers, the interior layers having an alternating orientation with the exterior surface of a first interior layer being immediately adjacent to the exterior surface of an adjacent second interior layer.

11. The assembly of claim 10 wherein the interior surface of the first interior layer being immediately adjacent to the interior surface of a third interior layer adjacent to the first interior layer.

12. The assembly of claim 8 wherein the layers are defined by flattened bamboo culms.

13. The assembly of claim 8 wherein the beam assembly is configured as a utility pole cross arm.

14. The assembly of claim 8, further comprising a height defined by the first or second side surface, and a width defined by the top or bottom surface, wherein the height is greater than the width.

15. An engineered beam assembly upon which loads are applied, the beam assembly comprising:
   opposing top and bottom surfaces, opposing first and second side surfaces extending between the top and bottom surfaces, and a longitudinal axis substantially parallel to the top, bottom, first, and second side surfaces, wherein the loads are substantially normal to the top or bottom surface;
   a plurality of substantially parallel layers of flattened bamboo or vegetable cane culms stacked and laminated together, each layer formed by at least one flattened, generally planar culm, and each culm has a plurality of fiber bundles extending substantially parallel to the longitudinal axis and being impregnated with a binder, each culm having a thickness between opposing exterior and interior surfaces, wherein a density of the fiber bundles substantially decreases across the thickness from the exterior surface to the interior surface;
   wherein the engineered beam has a substantially rectangular cross-section such that a width dimension of the engineered beam is substantially consistent along the full height of the engineered beam; and
   wherein at least a plurality of the culms have alternating orientations, wherein the exterior surfaces of adjacent layers face in opposite directions relative to the top surface or first surface.

16. The assembly of claim 15 wherein the culms forming outermost layers face in opposite directions with the exterior surfaces defining the top and bottom surfaces.

17. The assembly of claim 15 wherein the plurality of substantially parallel layers comprise a first outer layer defining the first side surface, a second outer layer defining the second side surface, and a plurality of interior layers between the first and second outer layers, the interior layers having a common orientation with the exterior surface of a first interior layer being immediately adjacent to the interior surface of an adjacent second interior layer.

18. The assembly of claim 15 wherein the plurality of substantially parallel layers comprise a first outer layer defining the first side surface, a second outer layer defining the second side surface, and a plurality of interior layers between the first and second outer layers, the interior layers having an alternating orientation with the exterior surface of a first interior layer being immediately adjacent to the exterior surface of an adjacent second interior layer.

19. The assembly of claim 18 wherein the interior surface of the first interior layer being immediately adjacent to the interior surface of a third interior layer adjacent to the first interior layer.

20. The assembly of claim 15 wherein the layers are defined by flattened bamboo culms.

* * * * *